H. HAGER.
FEED MECHANISM FOR AUTOMATIC WEIGHING MACHINES.
APPLICATION FILED JULY 23, 1913.

1,098,108.

Patented May 26, 1914.

Witnesses:
Robert N. Weir
A. D. Carlson

Inventor:
Harry Hager
Foreé Bain & May
Attys.

UNITED STATES PATENT OFFICE.

HARRY HAGER, OF CHICAGO, ILLINOIS.

FEED MECHANISM FOR AUTOMATIC WEIGHING-MACHINES.

1,098,108.  Specification of Letters Patent.  Patented May 26, 1914.

Application filed July 23, 1913. Serial No. 780,678.

*To all whom it may concern:*

Be it known that I, HARRY HAGER, a citizen of the United States, residing at Chicago, in the county of Cook and State of Illinois, have invented certain new and useful Improvements in Feed Mechanism for Automatic Weighing-Machines, of which the following is a specification.

My invention relates to improvements in feed mechanism for automatic weighing machines and the like, and has for its general object to provide feeding mechanism for satisfactorily delivering material of a brittle, flaky nature, light weight and varying contour, normally difficult to feed, from a supply hopper to a suitable weighing machine, such for instance as a weighing scale of the type illustrated in my Patent 819,881 dated May 8th, 1906.

In the automatic weighing of material of the character stated, such as flaked corn, potato chips, or the like, to be packaged, it is a matter of considerable difficulty to secure an even and uniform feed from the hopper owing to the tendency of the light flaky material to mass upon, or bridge over, the delivery orifice, but for successful operation of the weighing machine it is very essential that the material flow be uniform, continuous and dependable, to avoid stoppages in the flow or intermittent, irregular delivery of the material in masses that will cause a false weighing. Also it is essential that the means employed to overcome the massing tendency of the material shall not break or injure it. These requirements are met by my invention.

Figure 1:
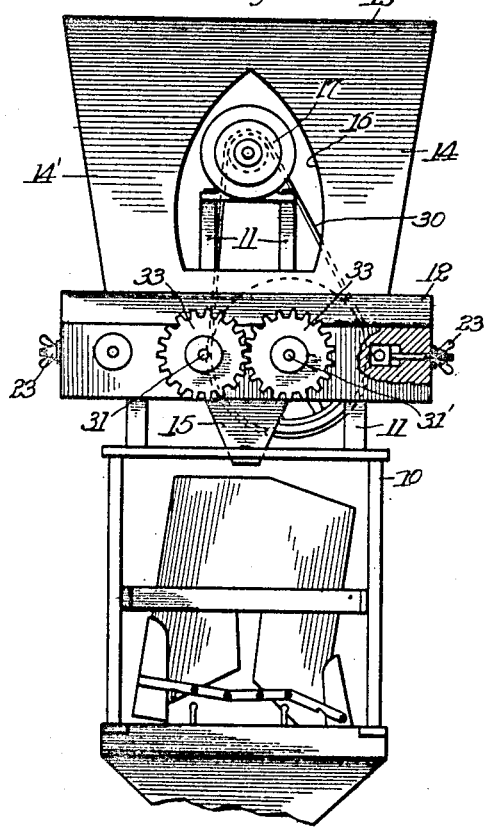
Figure 2:
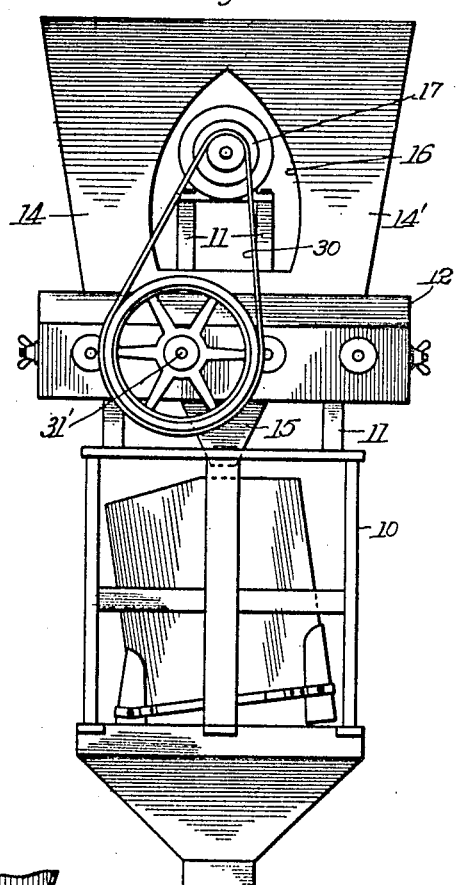
Figure 3:
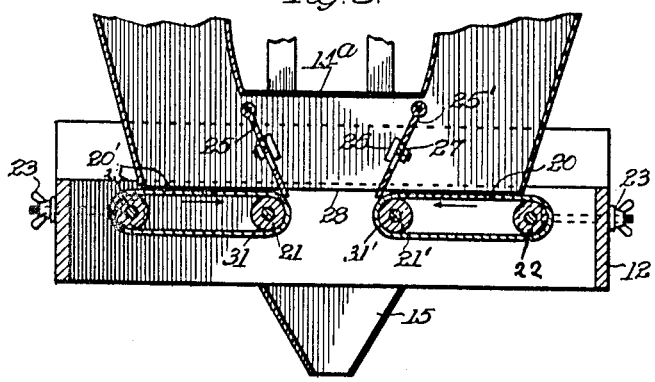
Figure 4:
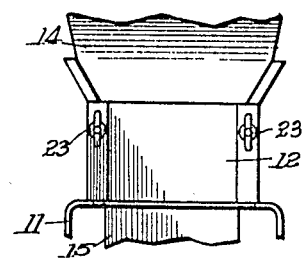

In the drawings wherein I have shown an embodiment of my invention Figure 1 is a side elevation of my improved feeding device; Fig. 2 is a side elevation of the opposite side; Fig. 3 is an enlarged cross section of a portion of the device and Fig. 4 is a fragmentary end view.

In the particular construction shown 10 indicates in general the frame of a weighing machine such as that illustrated in my said prior patent, having mounted thereon, as on bridge pieces 11, an automatic feeding mechanism, of which 12 indicates the body, in the form of a rectangular frame, open at top and bottom, 13 the supply hopper and 15 the central delivery spout for directing material to the scale, both 13 and 15 being carried by the body. The hopper 13 is preferably bifurcated, its two legs 14 and 14' spreading apart appropriately to leave therebetween a space 16 in which may be mounted the driving motor 17 or other prime mover for the feeding mechanism. The principal object of dividing the hopper, however, is to secure uniform tendency to delivery from opposite sides of the hopper through the two downwardly opening, separated mouths. Each leg, 14 and 14', of the hopper at its bottom opens on to a short endless belt, each belt, 20 and 20', being supported upon a driving roller 21 or 21' and an idler 22 suitably mounted in ball bearings in the frame 12. The driving rollers 21 21' are fixed in position, and the idler rollers 22 are adjustable by means of the tension bolts 23, extending to the ends of the body 12, to maintain the belts properly tightened. The outer wall of each hopper leg comes down substantially in contact with the belt and the inner wall stops short a suitable distance above the belt as best shown in Fig. 3, the inner walls being cross connected as by a platform 14ª leaving room for the valves 25—25', (preferably employed) pivoted in the opposite walls of the hopper structure and forming substantial continuations of the inner walls of the legs. Said valves preferably converge downward at a slight angle, each to lie in gravity-maintained contact with the end of the contiguous belt-flight, and each valve is preferably provided with a weight 26 adjustable thereon by slot and screw connection 27 so that the resistance of the valve to displacement may be varied as one means of varying the feed. The contiguous ends of the two belt-flights are separated somewhat and the mixing and delivery space 28, between them and up to the wall 14ª, vertically alines with the delivery spout 15.

Rotation is imparted from the prime mover 17 through belt and pulley connections 30 to the power shaft 31' of one of the rollers as 21', there being on the opposite side of the body 12 a pair of gears 33 for communicating opposite rotation from shaft 31' to shaft 31.

I have found this construction to be very efficacious in feeding corn flakes and other like materials which are inherently difficult to deliver without massing; the construction of the feeder with the two hopper legs each opening to a subjacent traveling belt for delivering two streams of material simultaneously and in common into a central delivery space 28, insuring that the material will positively move from the bottom of each hopper leg and that there will be no massing of the material to stop the flow. The opposing traveling bodies of material meet in a space where their mutual opposition causes them to drop freely and their travel is additionally directed downward both by the deflecting action of the valves 25—25' and the downward trend of the traveling belts around the rollers 21—21'. The straight-falling material flows through the directing spout 15 in a steady stream without danger of stoppage.

I find in practice that a machine constructed as above described will operate on very thin, brittle, flaky materials such as flaked corn, and similar stuffs without permitting them to mass, or "bridge" as their light weight and large irregular surface cause them to tend to do, and without any such agitation or compression as would destroy the desired form of the material by crushing or in any way injuring the same.

While I have herein described in some detail a particular embodiment of my invention which I have found in practice to be a commercially operable embodiment of my invention it will be apparent to those skilled in the art that numerous changes might be made in the details of construction without departure from the spirit of my invention and within the scope of the appended claims.

Having described my invention what I claim is:

1. Automatic feeding mechanism for brittle, flaky materials and the like, comprising two opposed hopper legs, and oppositely traveling belts at the lower ends of said hopper legs separated by a mixing space into which both belts may simultaneously deliver material from the two legs for gravitational descent below the belts.

2. Automatic feeding mechanism for brittle, flaky materials and the like, comprising two opposed hopper legs, oppositely traveling belts at the lower ends of said hopper legs separated by a mixing space into which both belts may simultaneously deliver material from the two legs for gravitational descent below the belts, and an open delivery spout below said mixing space to direct the course of the gravitational descent of said material.

3. Automatic feeding mechanism for brittle, flaky materials and the like, comprising two opposed hopper legs, oppositely traveling belts at the lower ends of said hopper legs separated by a mixing space into which both belts may simultaneously deliver material from the two legs for gravitational descent below the belts, and yielding members coöperating with the confronting ends of said belt-flights to regulate the delivery of material.

4. Automatic feeding mechanism for brittle, flaky materials and the like, comprising two opposed hopper legs, oppositely traveling belts at the lower ends of said hopper legs separated by a mixing space into which both belts may simultaneously deliver material from the two legs for gravitational descent below the belts, and pivoted valves above the respective belts coöperating with the confronting ends of said belt flights arranged to be forced away from said belts by the travel of the material toward the delivery space, and, in such position, to deflect the material downward.

5. Automatic feeding mechanism for brittle, flaky materials and the like, comprising two opposed hopper legs, oppositely traveling belts at the lower ends of said hopper legs separated by a mixing space into which both belts may simultaneously deliver material from the two legs for gravitational descent below the belts, and valves coöperating with said belts, and adjustable means for regulating the resistance of said valves to movement.

6. Automatic feeding mechanism for brittle, flaky materials and the like, comprising two opposed hopper legs, oppositely traveling belts at the lower ends of said hopper legs separated by a mixing space into which both belts may simultaneously deliver material from the two legs for gravitational descent below the belts, valves, 25, 25', opposing the confronting ends of said belts and adjustable weights, 26, 26', on said valves.

7. In a device of the character described, the combination of a bifurcated hopper, a motor located between the limbs of said hopper, belts traveling oppositely inward below the ends of the respective limbs of said hopper, said belts at the inner ends of their flights separated by a mixing space, rollers supporting said belts, a driving connection from said motor to one said roller and gearing connection between said roller and a driving roller of the opposing belt.

8. In a device of the character described, the combination of an open body or frame, a delivery spout located centrally below said frame, two opposing short endless belts carried by rollers journaled in said frame, and a bifurcated hopper supported by said frame having its limbs respectively opening at their lower ends to said belts and spaced apart to leave between the limbs and belts a mixing space.

9. In a device of the character described, the combination of an open body or frame, a delivery spout located centrally below said frame, two opposing short endless belts carried by rollers journaled in said frame, a bifurcated hopper supported by said frame having its limbs respectively opening at their lower ends to said belts and spaced apart to leave between the limbs and belts a mixing space, valves forming substantial continuations of the inner walls of said legs coöperating with the confronting ends of said belt and when in open position directing downward the material delivered by said belts.

In testimony whereof I hereunto set my hand in the presence of two witnesses.

HARRY HAGER.

In the presence of—
 FORÈE BAIN,
 MARY F. ALLEN.